Feb. 20, 1962   C. C. PEAKE ET AL   3,021,969
BOAT TRAILER BOW GUIDE
Filed Jan. 8, 1960   2 Sheets-Sheet 1
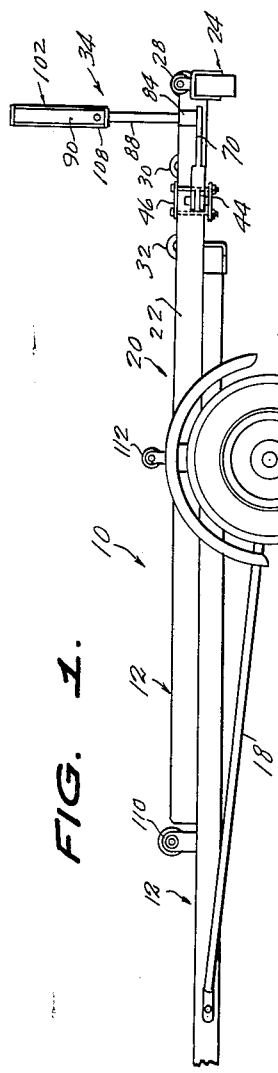
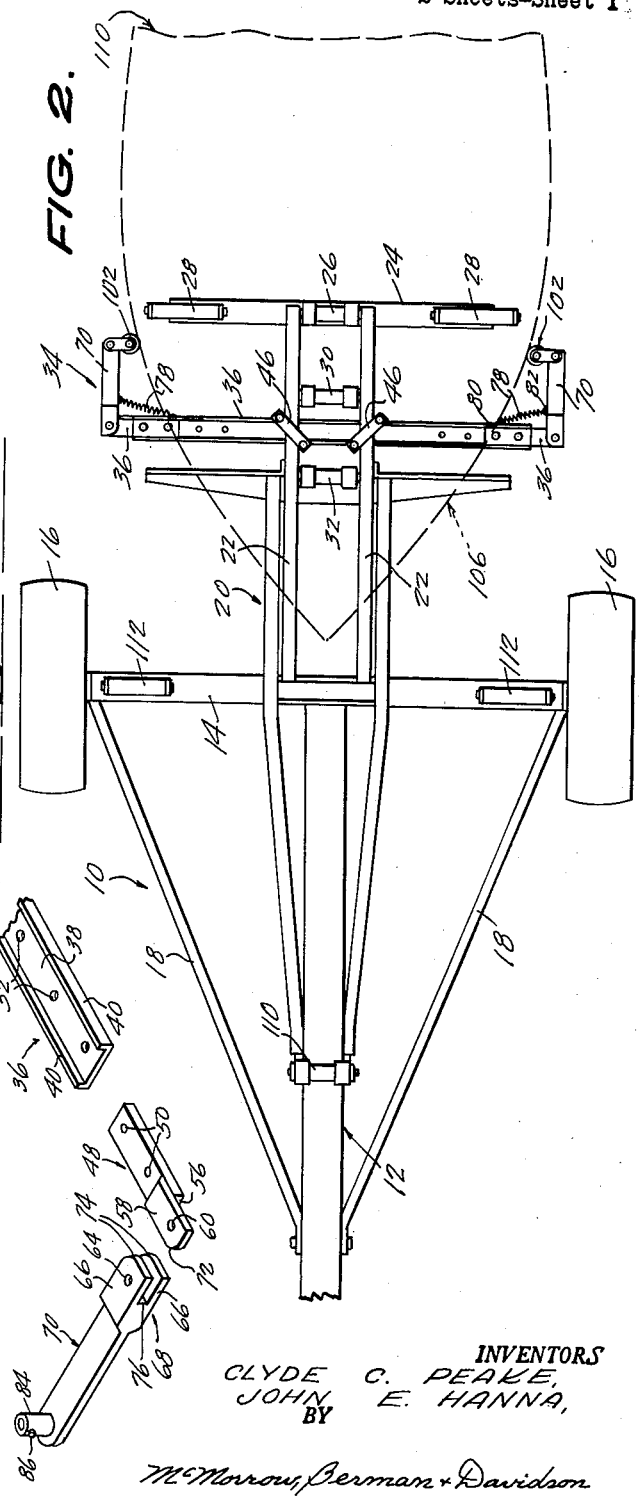
INVENTORS
CLYDE C. PEAKE,
JOHN E. HANNA,
BY
McMorrow, Berman & Davidson
ATTORNEYS.

Feb. 20, 1962
C. C. PEAKE ET AL
3,021,969
BOAT TRAILER BOW GUIDE
Filed Jan. 8, 1960
2 Sheets-Sheet 2
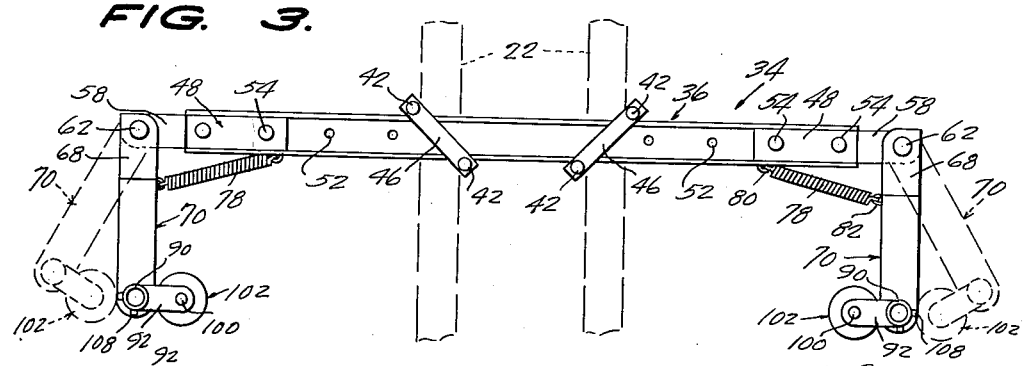
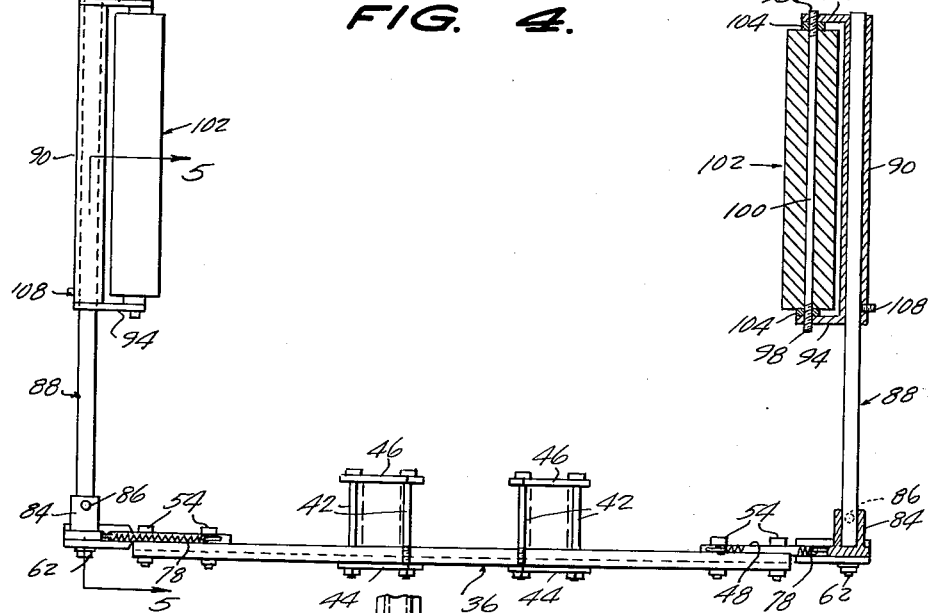
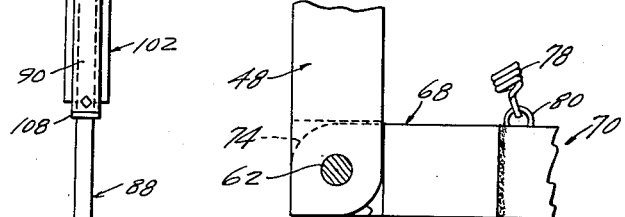
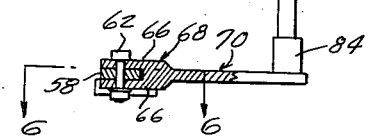
INVENTORS
CLYDE C. PEAKE,
JOHN E. HANNA,
BY
*McMorrow, Berman & Davidson*
ATTORNEYS.

United States Patent Office 3,021,969
Patented Feb. 20, 1962

3,021,969
BOAT TRAILER BOW GUIDE
Clyde C. Peake, 735 S. Washington, and John E. Hanna, 805 S. Washington, both of Liberal, Kans.
Filed Jan. 8, 1960, Ser. No. 1,220
4 Claims. (Cl. 214—84)

This invention relates to a novel bow guide for boat trailers.

The primary object of the invention is the provision of a device of the kind indicated to be built in a boat trailer or to be an attachment to be applied to a boat trailer, which, when a trailer is backed into the water on a shoreline, enables a boat to be driven directly onto the trailer or to be winched directly onto the trailer, without need for the operator of the boat or any other person to get into the water to guide or otherwise maneuver the boat onto the trailer.

Another object of the invention is to provide a simply constructed and easily installed bow guide attachment for boat trailers which is readily adjustable to accommodate boats of different beams, and which is further adjustable to enable attachment thereof on trailers of different widths and of different makes and constructions.

A further object of the invention is to provide a device of the character indicated above which has vertical boat side engaging guide rollers which are yieldably spring-biased toward each other, so as to accept therebetween a boat bow not perfectly aligned with the trailer, and automatically force the boat into alignment with the trailer, as the boat is driven or is winched onto the trailer.

A still further object of the invention is to provide a device of the character indicated above wherein the guide rollers are vertically adjustable to engage the sides of boats of different heights.

Other important objects and advantageous features of the invention will be apparent from the following description and the accompanying drawings, wherein, for purposes of illustration only, a specific form of the invention is set forth in detail.

In the drawings:

FIGURE 1 is a right-hand side elevation of a boat trailer equipped with a bow guide device of the present invention;

FIGURE 2 is an enlarged fragmentary top plan view of FIGURE 1, showing, in phantom lines, a boat bow entering the guide device;

FIGURE 3 is a further enlarged top plan view of the device per se, showing the guide rollers in normal positions in full lines, and in spread positions in phantom lines;

FIGURE 4 is an enlarged rear elevation of the device, portions being broken away and in section;

FIGURE 5 is a vertical section taken on the line 5—5 of FIGURE 4;

FIGURE 6 is a further enlarged fragmentary horizontal section taken on the line 6—6 of FIGURE 5; and, FIGURE 7 is an exploded perspective view of the components of FIGURE 6.

Referring in detail to the drawings, wherein like numerals designate like parts throughout the several views, the numeral 10 generally designates only one form of conventional boat trailer which can be equipped with bow guide means in accordance with the present invention. The trailer 10 comprises a frame which includes a longitudinal draft tongue 12 which extends rearwardly over and is fixed to a transverse axle 14 on whose ends are journalled ground-engaging wheels 16. Diagonal brace rods 18 extend between and are fixed to the tongue 12 and outer end portions of the axle 14. Supportably fixed, intermediate its ends on the midportion of the axle 14 is a horizontal bed 20 which comprises parallel spaced longitudinal rails 22 extending rearwardly from the axle 14 and having fixed on the rear ends thereof a transverse roller supporting cross bar 24 on which are fixed upstanding boat supporting rollers, including a middle roller 26, located between the rails 22 and outrider rollers 28 spaced from opposite sides of the bed 20. Additional rollers 30 and 32 are located between and journalled on the rails 22 forwardly of the roller 26.

Shown mounted on the bed rails 22, preferably at a location forwardly of the cross bar 24 and its rollers, and between the rollers 30 and 32, is a bow guide device of the invention, generally designated 34. The device 34 comprises a transversely elongated, upwardly facing shallow channel beam 36 having a web 38 and upstanding side flanges 40, which is engaged, at its middle, with the undersides of the bed rails 22, and which is anchored thereto by clamping means, such as U-bolts, or as shown, by pairs of vertical bolts 42 which rise from plates 44 engaged with the undersides of the rails 22 at opposite sides of the rails 22, as shown in FIGURE 4, and are engaged, at their upper ends, through plates 46 which bear upon the upper sides of the rails. As shown in FIGURE 2, the bolts 42 of each pair are also engaged with opposite sides of the beam 36, and the plates 44 and 46 are thereby angled forwardly and laterally inwardly toward each other. Because of the character of the clamping means and the fact that the clamping means are fixed neither to the rails 22 nor to the beam 36, enables clamping the beam 36 to rails or other components of beds of trailers of different widths and constructions.

The device 34 further comprises elongated longitudinally adjustable flat pivot plates 48 of a width to fit snugly and slidably in the ends of the beam 36 and provided therealong with spaced bolt holes 50 to be registered with selected pairs of longitudinally spaced bolt holes 52, provided in the web 38 of the beam 36, and through which pairs of bolts 54 are adapted to be engaged and tightened, whereby the plates 48 can be given extended positions, relative to the ends of the beam 36, for wider boats, and given retracted positions for narrower boats.

Fixed upon the plates 48 and reaching beyond their outer ends 56, are vertically offset pivot lugs 58 which are provided with pivot holes 60 to accept vertical pivot bolts 62, which extend also through holes 64 in the vertically spaced legs 66 of clevises 68 on the inward ends of pivot arms 70, with the lugs 58 positioned between the legs 66. As shown in FIGURES 6 and 7, the lugs 58 have their rear laterally inward corners rounded, as indicated at 72, and the clevis legs 66 have their forward laterally outward corners rounded, as indicated at 74. The corners 72 of the lugs 58 and the corners 74 of the clevis legs provide clearance with the bottoms 76 of the clevises 68 and the ends 56 of the plates 48, to enable the pivot arms 70 to swing freely, relative to the pivot plates 48, from the normal forwardly extending right-angular relations of the pivot arms to the plates, shown in full lines in FIGURE 3, to laterally outwardly angled or spread positions, as shown in phantom lines in FIGURE 3. Contractile springs 78 are stretched diagonally between and are fixed to the beam 36 and the pivot arms 70, as indicated at 80 and 82, respectively, so that the pivot arms 72 are yieldably and forcibly biased inwardly to their normal straight forward positions, wherein they are stopped by engagement of the inward edges of the lower legs 66 of the clevises 68 with the outer ends 56 of the plates 48.

Fixedly mounted upon the pivot arms 70, at their outer ends, are upstanding sockets 84 having set screws 86 extending through their sidewalls. Vertical standards, in the form of round rods or tubes 88, have lower end portions seated in the sockets 84 and locked therein by the set screws 86. Rotatably and slidably circumposed on upper end portions of the rods or standards 88 are guide roller carrying sleeves 90 which have thereon vertically spaced laterally projecting upper and lower arms 92 and 94, respectively, through which are extended the threaded upper and lower ends 96 and 98, respectively, of roller shafts 100, on which vertical guide rollers 102, preferably rubber, are journalled between the arms 92 and 94. The ends of the roller shafts 100 are threaded through nuts 104, on the arms 92 and 94, which are located at the roller sides of these arms to serve as spacers which space related ends of the rollers 102 from the arms 92 and 94. The guide rollers 102 are adjustable both vertically on the standards 88 and around the standards, so as to position the rollers for proper engagement with the sides of a boat bow 106 entering the trailer 10, as shown in phantom lines in FIGURE 2, and are adapted to be locked in such positions by means of set screws 108 in the sleeves 90 to bear against the standards 88.

It will be understood from the foregoing that a boat 110, either driven or winched toward the trailer 10, will put its bow portion first upon the rear trailer rollers and then the forward rollers, and at the same time engage the guide rollers 102 with its sides, so that, as the boat progresses forwardly onto the trailer bed 20, the guide rollers 102 and their pivot arms 70 are progressively more widely spread, against the resistance of the springs 78, until the maximum beam or width of the boat is reached, and that the guide rollers 102 are held in contact with the boat sides while the boat is on the trailer. It will also be understood that should the boat approach the trailer off-center relative thereto, the resulting greater deflection of one guide roller 102 by one side of the boat bow and the accompanying relatively great tensioning of its spring 78, will cause such one roller and its spring to react and push the boat toward alignment with the trailer, and against the other guide roller 102, so that the boat becomes aligned with the trailer in the course of its forward movement onto the trailer, and onto the front roller 110 on the trailer tongue 12, and acurately centered with respect to the trailer's side rollers 112.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a boat trailer having a horizontal bed having a rear end, transverse rear boat supporting rollers upstanding on said rear end, a horizontal transverse beam extending across and engaging said bed at a point spaced forwardly from said rear rollers, means fixing said beam to the bed, an arm disposed at a right angle with respect to the beam at each end of the beam and extending rearwardly of the beam, the forward end of each arm being pivoted on the beam for movement of the arm about a vertical axis from the right-angular relation position to a position at an angle to the right-angular relation position, said arms having rear ends, upstanding guide roller means mounted on the rear ends of the pivot arms, and spring means biasing the pivot arms toward each other.

2. In combination, a boat trailer having a horizontal bed having a rear end, transverse rear boat supporting rollers upstanding on said rear end, a horizontal transverse beam extending across and engaging said bed at a point spaced forwardly from said rear rollers, means fixing said beam to the bed, rearwardly extending pivot arms having forward ends pivoted on the beam at related ends of the beam, said arms having rear ends, upstanding vertical guide roller means mounted on the rear ends of the pivot arms, and spring means biasing the pivot arms toward each other, said guide roller means comprising upstanding rods, sleeves engaged rotatably and slidably on the rods, vertical rollers mounted on the laterally inward sides of the sleeves, and locking means for locking the sleeves to the rods in selected vertically and rotatably adjusted positions on the rods.

3. In combination, a boat trailer having a horizontal bed having a rear end, transverse rear boat supporting rollers upstanding on said rear end, a horizontal transverse beam extending across and engaging said bed at a point spaced forwardly from said rear rollers, means fixing said beam to the bed, an arm disposed at a right angle with respect to the beam at each end of the beam and extending rearwardly of the beam, the forward end of each arm being pivoted on the beam for movement of the arm about a vertical axis from the right-angular relation position to a position at an angle to the right-angular relation position, said arms having rear ends, upstanding guide roller means mounted on the rear ends of the pivot arms, and spring means biasing the pivot arms toward each other, said beam comprising a channel form having a web and side flanges, and pivot plates engaging the web between the side flanges and extending beyond the ends of the beam, means mounting said pivot plates for adjustment endwise relative to the beam, the forward ends of the pivot arms being pivoted on the pivot plates, said guide rollers comprising upstanding rods mounted at their lower ends on the pivot arms, sleeves slidably and rotatably engaged on the rods, means for locking the sleeves to the rods in selected vertically and rotationally adjusted positions thereon, said sleeves having lateral upper and lower arms, roller shafts extending between and secured at their ends to the lateral arms, and rollers journalled on the roller shafts between the lateral arms.

4. A boat bow guide comprising a normally horizontal beam, means for mounting the beam on a support, pivot arms pivotally mounted on the ends of the beam to swing relative thereto on vertical axes, upstanding guide roller means mounted on the pivot arms, spring means acting between the pivot arms and the beam and yieldably biasing the pivot arms toward angular relations to the beam and stop means acting between the beam and the pivot arms for limiting pivoting of the pivot arms in directions toward each other, said guide roller means comprising vertical rods fixed to and upstanding from said pivot arms, sleeves engaged slidably and rotatably on the rods, means for locking the sleeves in adjusted positions on the rods, and vertical rollers carried by the sleeves.

References Cited in the file of this patent

UNITED STATES PATENTS

| | | |
|---|---|---|
| 707,951 | Alexander | Aug. 26, 1902 |
| 1,518,278 | Schroeder et al. | Dec. 9, 1924 |
| 2,708,045 | Shontz | May 10, 1955 |
| 2,781,119 | Talbot et al. | Feb. 12, 1957 |
| 2,827,304 | Backus | Mar. 18, 1958 |
| 2,835,401 | Byrd | May 20, 1958 |
| 2,933,328 | McIntyre et al. | Apr. 19, 1960 |
| 2,977,012 | Maunula | Mar. 28, 1961 |